United States Patent
Dewey (10) Patent No.: US 10,904,606 B1
(45) Date of Patent: Jan. 26, 2021

(54) USING NON-AUDIO DATA EMBEDDED IN AN AUDIO SIGNAL

(71) Applicant: Roku, Inc., Los Gatos, CA (US)

(72) Inventor: Thomas Richard Henry Dewey, Cambridge (GB)

(73) Assignee: Roku, Inc., Los Gatos, CA (US)

( * ) Notice: Subject to any disclaimer, the term of this patent is extended or adjusted under 35 U.S.C. 154(b) by 0 days.

(21) Appl. No.: 16/750,191

(22) Filed: Jan. 23, 2020

(51) Int. Cl.
*H04N 21/43* (2011.01)
*H04N 21/485* (2011.01)
*H04N 21/845* (2011.01)

(52) U.S. Cl.
CPC ..... *H04N 21/4307* (2013.01); *H04N 21/4305* (2013.01); *H04N 21/4852* (2013.01); *H04N 21/8456* (2013.01)

(58) Field of Classification Search
CPC .......... H04N 21/4307; H04N 21/4305; H04N 21/4852; H04N 21/8456
USPC ........................................................ 348/515
See application file for complete search history.

(56) References Cited

U.S. PATENT DOCUMENTS

| | | | | |
|---|---|---|---|---|
| 7,281,053 B2 * | 10/2007 | Mantegna | ............... | G10L 19/18 370/516 |
| 8,345,637 B2 * | 1/2013 | Heath | ................... | H04W 24/10 370/332 |
| 10,171,543 B2 * | 1/2019 | Lee | ..................... | H04L 65/4092 |
| 2007/0017343 A1 * | 1/2007 | Nishida | .................... | G10C 3/12 84/423 R |
| 2014/0267561 A1 * | 9/2014 | Ahuja | ..................... | H04N 7/15 348/14.08 |
| 2015/0045922 A1 * | 2/2015 | Beckhardt | ........ | H04N 21/43615 700/94 |
| 2018/0061454 A1 * | 3/2018 | Herberger | ............ | H04N 21/816 |
| 2019/0297591 A1 * | 9/2019 | Crowe | ............... | H04N 21/6581 |
| 2020/0005830 A1 * | 1/2020 | Wasada | .................. | H04B 17/14 |
| 2020/0014963 A1 * | 1/2020 | Gogoi | ............. | H04N 21/44209 |

* cited by examiner

Primary Examiner — Michael Lee
(74) *Attorney, Agent, or Firm* — Sterne, Kessler, Goldstein & Fox P.L.L.C.

(57) ABSTRACT

Embodiments included herein generally relate to measuring a latency of a playback device. For example, a method includes: determining a first latency of a playback device; determining a second latency of the playback device; comparing the second latency to the first latency to determine whether an event occurred at the playback device; and in response to detecting a latency change between the second latency and the first latency indicating the occurrence of the event, adjusting a timing of a data stream provided to the playback device based on the latency change.

15 Claims, 5 Drawing Sheets

USING NON-AUDIO DATA EMBEDDED IN AN AUDIO SIGNAL

TECHNICAL FIELD

Embodiments included herein generally relate to using non-audio data embedded in an audio signal. More particularly, embodiments relate to using non-audio data embedded into the audio signal to measure a delay of a playback device.

BACKGROUND

In entertainment systems, media content may be distributed to any number of playback devices, such as speakers and/or televisions. In some situations, a user may want to determine a latency of the playback device. However, each individual playback device may incur a distinct latency, such that the user must account for such latency on a device by device basis.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

SUMMARY

Provided herein are system, apparatus, article of manufacture, method and/or computer program product embodiments, and/or combinations and sub-combinations thereof, for using non-audio data embedded into the audio signal to measure a delay of a playback device.

In some embodiments, the present disclosure is directed to a method for measuring a latency of a playback device. For example, the method includes: determining a first latency of a playback device; determining a second latency of the playback device; comparing the second latency to the first latency to determine whether an event occurred at the playback device; and in response to detecting a latency change between the second latency and the first latency indicating the occurrence of the event, adjusting a timing of a data stream provided to the playback device based on the latency change.

In further embodiments, the present disclosure is directed to a system having a memory for storing instructions for measuring a latency of a playback device and a processor configured to execute the instructions. The instructions may cause the processor to: determine a first latency of a playback device; determine a second latency of the playback device; compare the second latency to the first latency to determine whether an event occurred at the playback device; and in response to detecting a latency change between the second latency and the first latency indicating the occurrence of the event, adjust a timing of a data stream provided to the playback device based on the latency change.

In further embodiments, the present disclosure is directed to a non-transitory, tangible computer-readable device having instructions stored thereon for measuring a latency of a playback device that, when executed by at least one computing device, causes the at least one computing device to perform operations comprising: determining a first latency of the playback device; determining a second latency of the playback device; comparing the second latency to the first latency to determine whether an event occurred at the playback device; and in response to detecting a latency change between the second latency and the first latency indicating the occurrence of the event, adjusting a timing of a data stream provided to the playback device based on the latency change.

Further features and advantages of the embodiments disclosed herein, as well as the structure and operation of various embodiments, are described in detail below with reference to the accompanying drawings. It is noted that this disclosure is not limited to the specific embodiments described herein. Such embodiments are presented herein for illustrative purposes only. Additional embodiments will be apparent to a person skilled in the relevant art based on the teachings contained herein.

DETAILED DESCRIPTION OF THE INVENTION

Provided herein are system, method, computer program product and/or device embodiments, and/or combinations thereof, for measuring a delay of a playback device.

Figure 1:
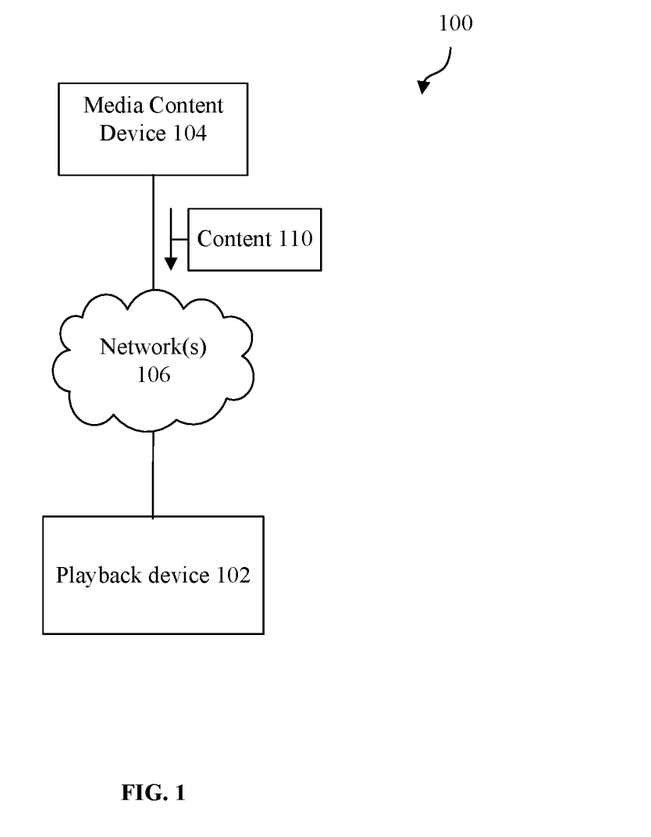
FIG. 1 illustrates an entertainment system, according to some embodiments.

FIG. 1 illustrates an entertainment system for providing audio content via a plurality of heterogeneous speaker devices. Referring to FIG. 1, an entertainment system 100 may include a playback device 102 placed in any location and/or configuration within a listening environment and a media content device 104. The playback device 102 may be a wireless or wired playback device.

The media content device 104 or the playback device 102 may be, without limitation, a media player, television, a wireless device, a smartphone, a tablet computer, a laptop/mobile computer, a handheld computer, a server computer, an in-appliance device, Internet of Things (IoT) device, streaming media player, a game console, and/or an audio/video receiver. In some embodiments, the media content device 104 may be located in the same listening environment as the plurality of speaker devices 102. Additionally, or alternatively, the media content device 104 may be located remotely from the playback device 102. In some embodiments, the playback device 102 and the content device 104 may communicate via a communication network(s) 106. The communication network 106 may include any or all of a wired and/or wireless private network, personal area network (PAN), Local-Area Network (LAN), a Wide-Area Network (WAN), or the Internet. In further embodiments, the media content device 104 and the playback device 102 may be connected using a wired connection, such as a high-definition multimedia interface (HDMI) wire.

The media content device 104 may be used to measure a latency of the playback device 102. For example, in some embodiments, media content 110 may be stored on the media content device 104 and transmitted through the playback device 102. The media content 110 may be combined with a second signal, such that the combined signal is used to measure the latency of the playback device 102. To generate the second signal, the media content device 104 may measure a clocking sample from an internal clock. In some embodiments, the internal clock may be a high-resolution clock. In some embodiments, the content device 104 may measure the clocking sample in response to detecting a connection between the content device 104 and the playback device 102. For example, detecting the connection may be either a wired connection using, for example, the HDMI wire or a wireless connection over the network 106.

The media content device 104 may encode the clocking sample using an encoder to generate an encoded data stream, e.g., an audio/video (AV) stream. The encoded data stream may be centered around an inaudible frequency range, i.e., inaudible to humans. For example, the encoded data stream may be centered around a frequency of about 19.5 kHz, e.g., between 19 kHz and 20 kHz. The clocking sample may be encoded using, for example, a frequency shift keying encoding scheme. It should be understood by those of ordinary skill in the that the frequency shift keying scheme is merely one example coding scheme that may be used, and that other encoding schemes are further contemplated in accordance with aspects of the present disclosure.

The media content device 104 may combine the media content 110 with the encoded data stream to generate a global data stream and transmit the global data stream through the playback device 102. In some instances, the playback device 102 may cause an internal latency with respect to the global data stream. For example, the playback device 102 may cause the internal latency when normalizing a volume of the global data stream. After the playback device 102 processes the global data stream, the playback device 102 may return the global signal back to the media content device 104. The returned signal may include audio samples, such as pulse-code modulation (PCM) samples.

The media content device 104 may decode the audio samples received from the playback device 102 using a decoder to extract timestamps of the playback device 102. For example, the media content device 104 may decode the audio samples using a decoding scheme configured to decode information encoded using the frequency shift keying scheme. The media content device 104 may then compare the extracted timestamps with the clocking sample to determine the latency of the playback device 102 (i.e., a reference latency). In some embodiments, the media content device 104 may adjust a timing of the media content 110 based on the latency of the playback device 302.

The media content device 104 may periodically retransmit the global data stream to the playback device 102 and measure the latency of the playback device 102, as discussed herein. In some embodiments, the period for retransmitting the global data stream may be every 5 to 10 milliseconds. It should be understood by those of ordinary skill in the art that this is merely an example period and that other periods (i.e., shorter or longer periods) are also contemplated in accordance with aspects of the present disclosure. At each interval, the media content device 104 may compare a current latency of the playback device 102 with the reference latency to detect a change in a configuration of the playback device 102. Alternatively, the media content device 104 may compare a current latency of the playback device 102 with a most recent latency of the playback device 102 to detect the change in the configuration of the playback device 102.

For example, the change in the configuration of the playback device 102 may include an algorithmic change of the playback device 102. The operating algorithm may be, for example, an algorithm change indicating a playback mode of the playback device 102 (e.g., movie mode, sports mode, or the like). During operation, the algorithmic change may cause a change in the latency in the playback device 102 due to changes in, for example, the audio settings (e.g., bass, treble, balance, equalizer(s), mono/stereo, or the like) for each respective playback mode.

As another example, the change in configuration of the playback device 102 may include an addition of one or more external devices coupled to the playback device 102. For example, the additional external devices may include one or more speakers, such as a surround sound system having various woofers, subwoofers, sound bars, or any combination thereof. In such situations, the addition of the external device may cause additional latency at the playback device. During operation, the external devices connected to the playback device 102 may cause a change in the latency in the playback device 102 when the playback device synchronizes playback of the media content 110 with the external devices.

In some embodiments, the media content device 104 may also determine a clock drift of the playback device 102. The clock drift may be caused by, for example, a temperature of the environment of the playback device 102, an age the playback device 102, etc. The clock drift may be determined by comparing an expected latency to a plurality of measured latencies across a number of different intervals to establish if the latency is drifting, e.g., increasing. This clock drift may be caused by the internal clock of the playback device 102 progressing at a different rate compared to the expected latency.

Figure 2:
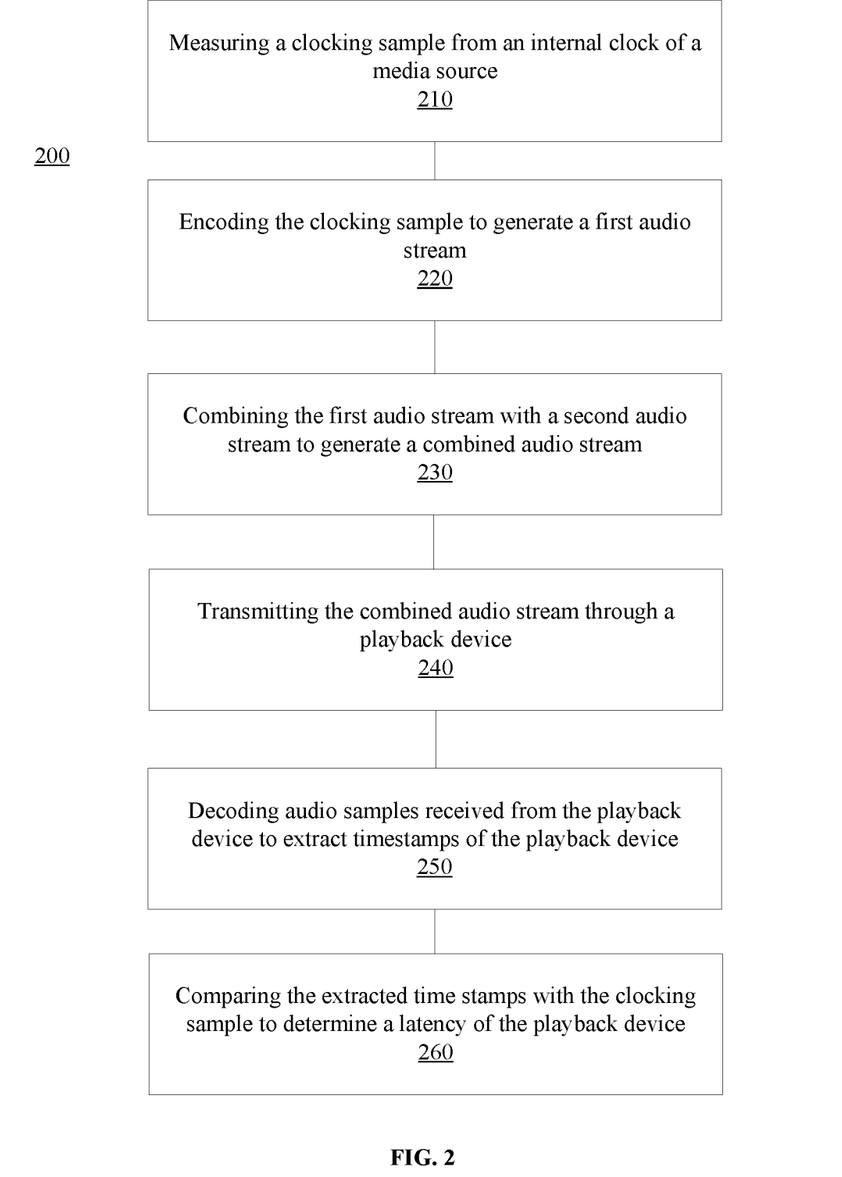
FIG. 2 illustrates a flowchart for measuring latency of a media playback device, according to some embodiments.

FIG. 2 illustrates a flowchart for measuring a latency of a playback device, according to some embodiments. In 210, a processor of a media content device, for example, processor 406 of FIG. 4, may measure a clocking sample from an internal clock, for example, internal clock 412 of FIG. 4, of a media source. In 220, an encoder, for example, encoder 404 of FIG. 4, may encode the clocking sample to generate a first data stream, and in 230, the processor 406 may combine the first data stream with a second data stream to generate a combined data stream. In 240, a communications interface, for example, communications interface 402 of FIG. 4, may transmit the combined data stream through a playback device. In 250, a decoder, for example, decoder 414 of FIG. 4, may decode audio samples received from the playback device to extract timestamps of the playback device. In 260, the processor 406 may compare the extracted timestamps with the clocking sample to determine a latency of the playback device. These processes are described in greater detail in co-pending patent application Ser. No. 16/553,579, filed Aug. 28, 2019, the contents of which are hereby incorporated in their entirety.

Figure 3:
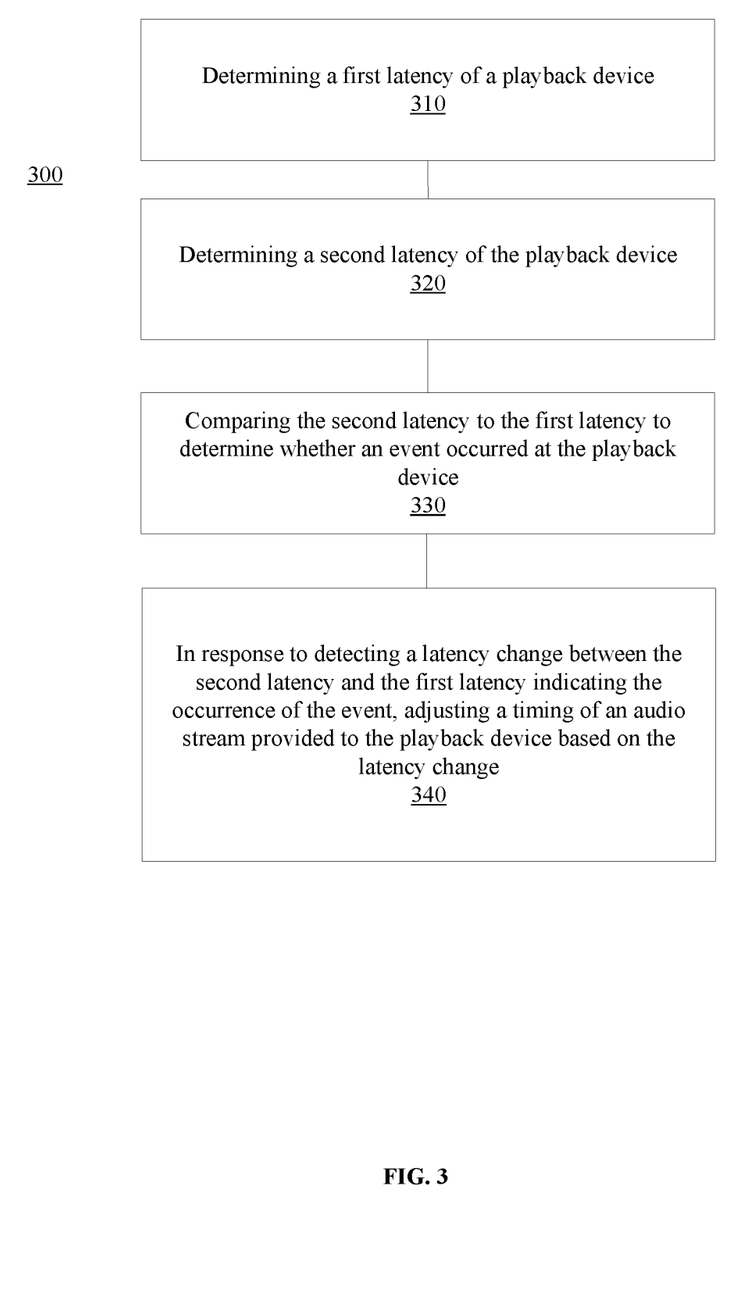
FIG. 3 illustrates a flowchart for measuring a variable latency of a media playback device, according to some embodiments.

FIG. 3 illustrates a flowchart for measuring a variable latency of a playback device. At 310, a processor, for example, processor 406 of FIG. 4, may determine a first latency of a playback device, for example, playback device 102 of FIG. 1, and at 320, the processor 406 may also determine a second latency of the playback device. In some embodiments, the first and second latencies may be determined using the processes with respect to FIG. 2. At 330, the processor 406 may compare the second latency to the first latency to determine whether an event occurred at the playback device. In some embodiments, the second latency may be determined periodically, e.g., every 5 to 10 milliseconds. At 340, in response to detecting a latency change between the second latency and the first latency indicating the occurrence of the event, the processor 406 may adjust a timing of a data stream provided to the playback device based on the latency change. The event comprises an algorithmic change of the playback device indicating a change in a playback mode of the playback device 102 (e.g., movie mode, sports mode, or the like). The event may also include a connection to an external device by the playback device. For example, the additional external devices may include one or more speakers, such as a surround sound system having various woofers, subwoofers, sound bars, or any combination thereof.

Figure 4:
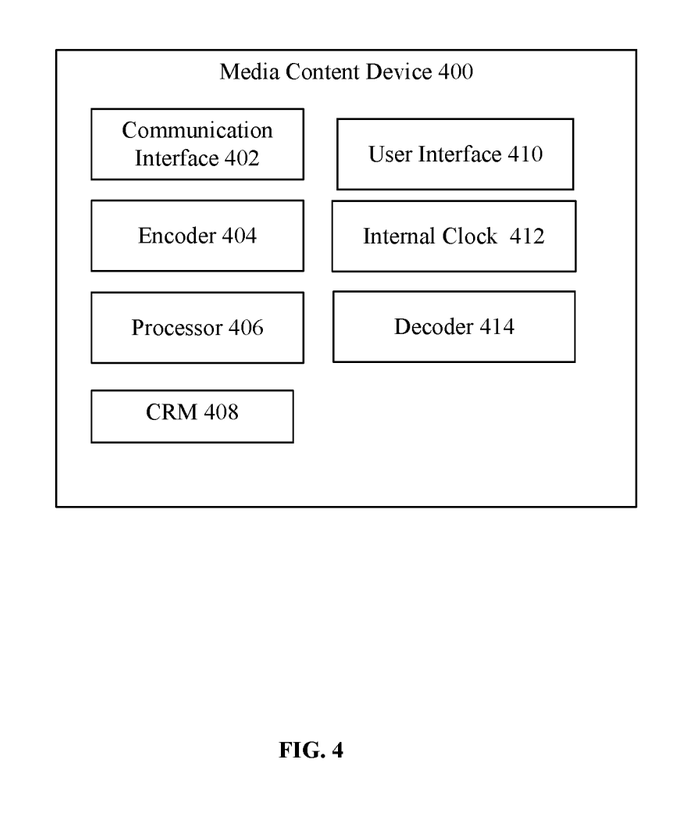
FIG. 4 illustrates a media content device, according to some embodiments.

FIG. 4 illustrates a media content device, according to some embodiments. In some embodiments, the media content device 400 may comprise one or more communication interfaces 402 for transmitting content (e.g., the media content 110 of FIG. 1) to a playback device (e.g., playback device 102 of FIG. 1), an encoder 404 for encoding, for example, a clock signal, a processor 406 (e.g., a digital signal processor), a non-transitory, tangible computer readable memory 408 coupled to the processor 406, a user interface 410, an internal clock 412, and a decoder 414. The communication interface(s) 402 may include one or more interfaces and hardware components for enabling communication with various other devices. For example, communication interface(s) 402 may facilitate communication through one or more of the Internet, cellular networks, and wireless networks (e.g., Wi-Fi, cellular). The non-transitory, tangible computer readable memory (CRM) 408 may be used to store the media content (e.g., media content 110 of FIG. 1), as well as any number of functional components that are executable by the processor 406. In many implementations, these functional components comprise instructions or programs that are executable by the processor 406 and that, when executed, specifically configure the one or more processors 406 to perform the actions attributed above to the media content device (e.g., the media content 110 of FIG. 1). In addition, the non-transitory, tangible computer readable memory 408 stores data used for performing the operations described herein.

It will be appreciated by those skilled in the art that the functionality of the speaker devices described herein may be performed by other entertainment devices, such as a media player, television, a wireless device, a smartphone, a tablet computer, a laptop/mobile computer, a handheld computer, a server computer, an in-appliance device, streaming media player, a game console, an audio/video receiver, and so forth.

Example Computer System

Figure 5:
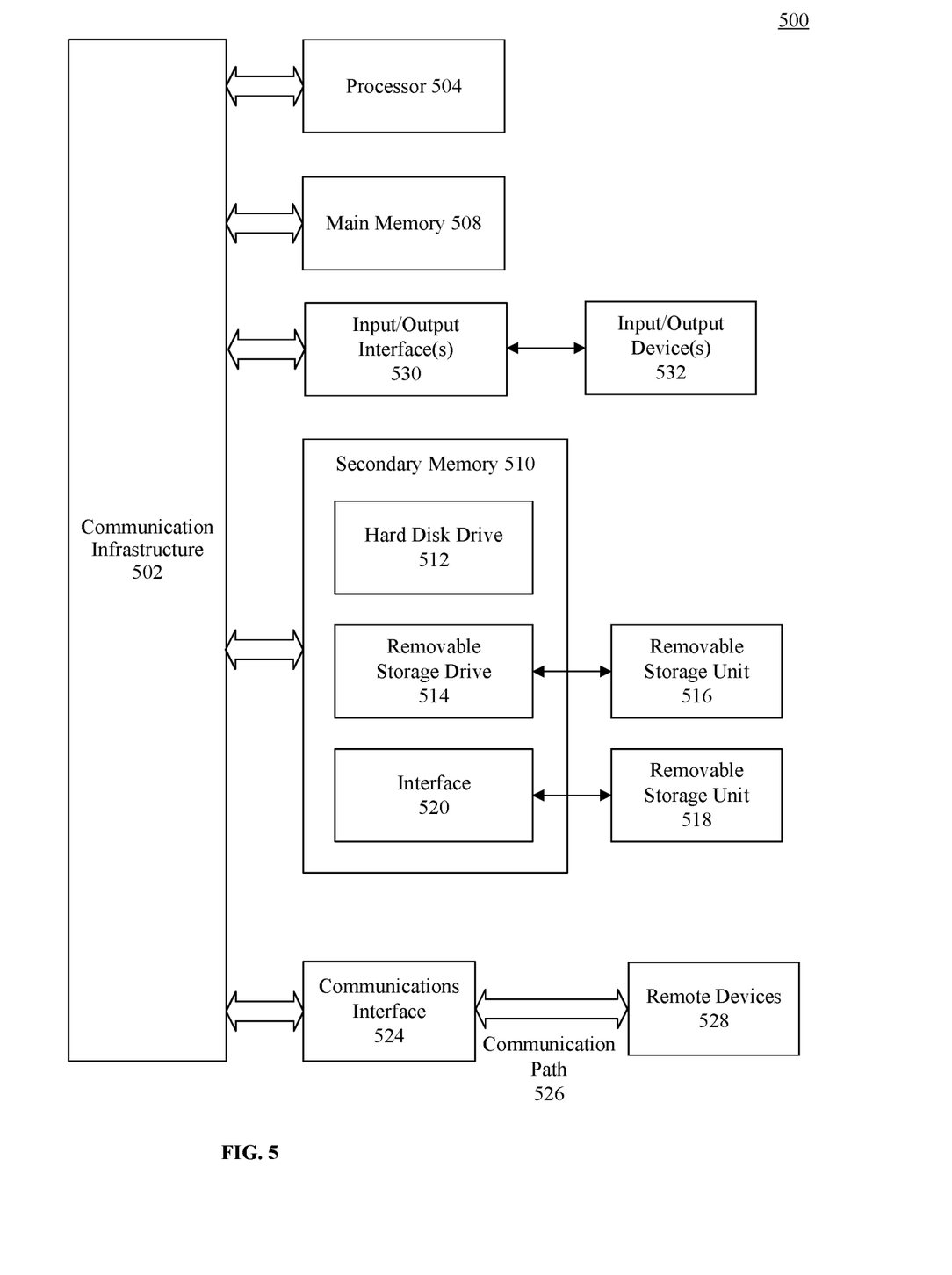
FIG. 5 illustrates an example computer system useful for implementing various embodiments.

Various embodiments can be implemented, for example, using one or more well-known computer systems, such as computer system 500 shown in FIG. 5. Computer system 500 can be any well-known computer capable of performing the functions described herein, such as computers available from International Business Machines, Apple, Sun, HP, Dell, Sony, Toshiba, etc.

Computer system 500 includes one or more processors (also called central processing units, or CPUs), such as a processor 504. Processor 504 is connected to a communication infrastructure or bus 506.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   determining a first latency of a playback device;
   determining a second latency of the playback device;
   determining whether an event occurred at the playback device by comparing the second latency to the first latency, the event occurring when there is a latency change between the first latency and the second latency, and the event comprising an algorithmic change of the playback device or a connection to an external device by the playback device;
   in response to determining that the event occurred, adjusting a timing of a data stream provided to the playback device based on the latency change.

2. The method of claim 1, wherein:
   determining the first latency and the second latency each comprises:
   measuring a clocking sample from an internal clock of a media source;
   encoding the clocking sample to generate a first data stream;
   combining the first data stream with a second data stream to generate a combined data stream;
   transmitting the combined data stream through the playback device;
   decoding audio samples received from the playback device to extract timestamps of the playback device; and
   comparing the extracted timestamps with the clocking sample to determine the first latency or the second latency.

3. The method of claim 2, wherein encoding the clocking sample comprises encoding the clocking sample using a frequency shift keying scheme.

4. The method of claim 1, wherein determining the second latency comprises periodically determining the second latency.

5. The method of claim 4, wherein periodically determining the second latency comprises periodically determining the second latency every 5 to 10 milliseconds.

6. A system comprising:
   a memory for storing instructions for measuring a latency of a playback device;
   a processor configured to execute the instructions, the instructions causing the processor to:
   determine a first latency of a playback device;
   determine a second latency of the playback device;
   determine whether an event occurred at the playback device by comparing the second latency to the first latency, the event occurring when there is a latency change between the first latency and the second latency, and the event comprising an algorithmic change of the playback device or a connection to an external device by the playback device;
   in response to determining that the event occurred, adjust a timing of a data stream provided to the playback device based on the latency change.

7. The system of claim 6, wherein:
   to determine each of the first latency and the second latency, the instructions further cause the processor to:
   measure a clocking sample from an internal clock of a media source;
   encode the clocking sample to generate a first data stream;
   combine the first data stream with a second data stream to generate a combined data stream;
   transmit the combined data stream through a playback device;
   decode audio samples received from the playback device to extract timestamps of the playback device; and
   compare the extracted timestamps with the clocking sample to determine the first latency or the second latency.

8. The system of claim 7, wherein, to encode the clocking sample, the instructions further cause the processor to encode the clocking sample using a frequency shift keying scheme.

9. The system of claim 6, wherein, to determine the second latency, the instructions further cause the processor to periodically determine the second latency.

10. The system of claim 9, wherein, to periodically determine the second latency, the instructions further cause the processor to periodically determine the second latency every 5 to 10 milliseconds.

11. A non-transitory, tangible computer-readable medium having instructions stored thereon for measuring a latency of a playback device that, when executed by at least one computing device, causes the at least one computing device to perform operations comprising:

determining a first latency of the playback device;

determining a second latency of the playback device;

determining whether an event occurred at the playback device by comparing the second latency to the first latency, the event occurring when there is a latency change between the first latency and the second latency, and the event comprising an algorithmic change of the playback device or a connection to an external device by the playback device;

in response to determining that the event occurred, adjusting a timing of a data stream provided to the playback device based on the latency change.

12. The medium of claim 11, wherein:

determining the first latency and the second latency each comprises:

measuring a clocking sample from an internal clock of a media source;

encoding the clocking sample to generate a first data stream;

combining the first data stream with a second data stream to generate a combined data stream;

transmitting the combined data stream through the playback device;

decoding audio samples received from the playback device to extract timestamps of the playback device; and comparing the extracted timestamps with the clocking sample to determine the first latency or the second latency.

13. The medium of claim 12, wherein encoding the clocking sample comprises encoding the clocking sample using a frequency shift keying scheme.

14. The medium of claim 11, wherein determining the second latency comprises periodically determining the second latency.

15. The medium of claim 14, wherein periodically determining the second latency comprises periodically determining the second latency every 5 to 10 milliseconds.

\* \* \* \* \*